United States Patent Office 3,351,622
Patented Nov. 7, 1967

3,351,622
POLYMERS AND TEXTILE MATERIALS
TREATED THEREWITH
Giuliana C. Tesoro, Dobbs Ferry, N.Y., assignor to J. P. Stevens & Co., Inc., New York, N.Y., a corporation of Delaware
No Drawing. Filed Sept. 30, 1963, Ser. No. 312,284
27 Claims. (Cl. 260—89.7)

The present invention relates to novel polymers and method of making them, and further relates to novel method for improving the properties of hydrophobic materials. More specifically, the present invention relates to novel polymeric antistatic materials and to a method for imparting antistatic properties to textile materials which have the tendency to accumulate static charges.

Textile materials manufactured from hydrophobic fibers have a relatively low capacity to retain moisture in comparison with natural fibers such as cotton, wool and rayon, and normally tend to accumulate electrostatic charges on their surfaces. These electrostatic charges can accumulate on the hydrophobic materials when exposed to rubbing during the processing of the fiber or fabric in the manufacturing operation or in use as a finished article of apparel. A garment manufactured from hydrophobic materials and not properly treated will cling to the wearer rather than hang smoothly. In order to reduce or overcome this objectionable tendency, suitable antistatic finishes for these materials are required.

In the past, several products and methods have been employed to impart antistatic properties to textile materials, however, many of these conventional finishes do not remain effective after repeated launderings and dry cleanings of the garment, and moreover, the appearance, feel, and other physical properties of the textile material may frequently be deleteriously affected. Furthermore, some of the antistatic finishes require complex methods of preparation which are costly and difficult to carry out in conventional equipment.

It is an object of this invention to provide novel polymeric compositions and methods for making same.

It is another object of this invention to avoid the shortcomings and disadvantages of the prior known methods and compositions for improving the propertise of hydrophobic textile materials.

It is another object of this invention to provide novel compositions for improving the properties of hydrophobic textile materials.

It is a further object of this invention to provide a method for making durable antistatic finishes.

It is a further object of this invention to provide a method for imparting antistatic properties to textile materials which normally have the tendency to accumulate electrostatic charges.

It is still a further object of this invention to provide textile materials which have a reduced tendency to accumulate electrostatic charges on the surfaces thereof.

In attaining the above objects, one feature of the present invention resides in the novel polymeric substances which comprise the product of a copolymerization reaction between a polyoxyalkylene compound and a polyfunctional amide compound.

Another feature of the present invention resides in treating textile materials with a polymerizable composition comprising a polyoxyalkylene compound and a polyfunctional amide compound.

The above objects and features, as well as other objects and features will become apparent from the following detailed description of the invention.

The polyoxyalkylene compounds that are employed in the preparation of the novel polymers of the present invention include straight and branched chain oxyalkylene compounds containing at least two recurring groups of the structure —$(C_nH_{2n}O)$— where $n$ is an integer from 2 to 4. More particularly, the polyoxyalkylene compounds contain at least two terminal groups selected from the group consisting of —OH, —SH, and —NRH, wherein R is selected from the group consisting of hydrogen and lower alkyl, i.e. from 1 to 5 carbon atoms.

Included in the group of polyoxyalkylene compounds are compounds of the structure represented by the formula:

(I)   

in which $n$ is an integer from 2 to 4, $m$ is integer from 3 to 50 and Y is selected from the group consisting of oxygen, sulfur, and —NR in which R is hydrogen or lower alkyl, and II.   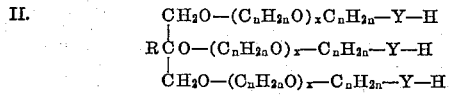

in which $n$, Y and R have the same meaning as above and $x$ is an integer from 2 to 20.

Examples of polyoxyalkylene compounds suitable for the purposes of this invention include polyalkylene glycols of the formula: $HO(C_nH_{2n}O)_mC_nH_{2n}OH$, e.g. polyethylene glycols of molecular weights ranging from about 300 to 1500, corresponding dithiols of the formula:

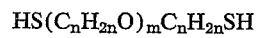

and corresponding diamines of the formula:

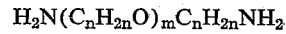

Triols obtained by reacting alkylene oxides with glycerol, trimethylol propane and related compounds as well as the corresponding trimercaptyl or triamino compounds are examples of polyoxyalkylene compounds of Formula II. Mixtures of two or more of the above polyoxyalkylene compounds can also be employed for purposes of this invention.

The polyfunctional amide compounds which are employed for the preparation of the novel polymers of the present invention include compounds containing at least two groupings of the structure >NCO—Z. Included are those compounds containing two groups of the structure >NCO—Z linked by hydrocarbon groups such as aliphatic and cycloaliphatic groups and wherein Z is selected from the group consisting of

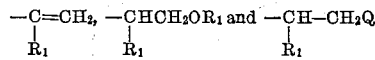

wherein $R_1$ is hydrogen or lower alkyl, and Q is a polar residue derived from a reagent of weak nucleophilic character and is selected from the group consisting of the anion of a strong acid and the cation of a weak base. Included in this group of polyfunctional amides are those of the formulae:

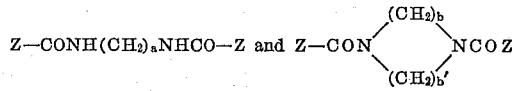

wherein $a$ is an integer from 1 to 6 and $b$ and $b'$ are integers from 1 to 3. It is to be understood that the radical Z of the above compounds can be the same or different. Specific examples of these polyfunctional amides are N, N' methylene bis-acrylamide

diacryloyl piperazine $$H_2C=CHCON\diagup_{CH_2-CH_2}^{CH_2-CH_2}\diagdown NCOCH=CH_2$$

and N,N'-hexamethylene bis-beta methoxy propionamide $$CH_3OCH_2CH_2CONH(CH_2)_6NHCOCH_2CH_2OCH_3$$

Further polyfunctional amides which are employed for the purposes of the present invention are triazine compounds represented by the structural formula:

$$\begin{array}{c} CO-Z^1 \\ | \\ N \\ CH_2 \diagup \diagdown CH_2 \\ Z-CO-N \quad N-CO-Z \\ \diagdown CH_2 \diagup \end{array}$$

wherein Z is a member selected from the group consisting of $$-\underset{R_1}{\overset{|}{C}}=CH_2, \quad -\underset{R_1}{\overset{|}{C}HCH_2OR_1}, \quad -\underset{R_1}{\overset{|}{C}HCH_2Q}$$

and mixtures thereof, wherein $R_1$ is hydrogen or lower alkyl, and Q is a polar residue derived from a reagent of weak nucleophilic character and is selected from the group consisting of the anion of a strong acid and the cation of a weak base, and $Z^1$ is selected from the group consisting of $$-\underset{R_1}{\overset{|}{C}HCH_2OR_1}$$

and $$-\underset{R_1}{\overset{|}{C}HCH_2Q}$$

These compounds are characterized by good solubility, particularly water solubility.

Included in this group of polyfunctional amide compounds are 1,3,5-tris-beta-methoxypropionyl-s-perhydrotriazine, 1-beta-pyridinium-propionyl-3,5-acryloyl-s-perhydrotriazine, 1-thiosulfatopropionyl-3,5-acryloyl-s-perhydrotriazine and the like.

The polar residue Q is intended to include anions of strong acids with an ionization constant of greater than $10^{-5}$ and cations of weak bases with an ionization constant of less than $10^{-5}$. Illustrative of but not limiting the polar residue are the following Sulfate —$OSO_3M$
Thiosulfate —$SSO_3M$
Acetate —$OCOCH_3$
Formate —$OCOH$
Propionate —$OCOC_2H_5$
Pyridinium —$\overset{+}{N}C_5H_5$
Benzyldimethyl Ammonium $-\overset{+}{N}\underset{CH_2C_6N_5}{\overset{CH_3}{\diagup}}\underset{}{\overset{CH_3}{\diagdown}}$ wherein M is an alkali metal, e.g., Na, K, Li, or ammonium.

By choosing the amounts and types of monomers employed for the copolymerization reaction various copolymers can be prepared which can range from linear water soluble polymeric molecules to complex insoluble and infusible three-dimensional structures.

When the copolymerization reaction is carried out employing two bifunctional monomers, such as, for example, a diol compound of Formula I and an amide containing two reactive groupings such as methylene bis-acrylamide, the resulting copolymer is essentially linear in which the recurring structural unit would be represented by the formula:

(III)   $[-Y-(C_nH_{2n}O)_mC_nH_{2n}-Y$
   $-CH_2CH_2CONH-X-NHCOCH_2CH_2-]$ in which X represents the hydrocarbon radical linking the two NCO groups, and Y, $n$ and $m$ have the same meaning as above.

If one or more of the monomers used in the copolymerization reaction is a trifunctional monomer such as those of Formula II or the polyfunctional amides such as triazines, the resulting copolymer product is a complex, insoluble and infusible three-dimensional structure containing some recurring segments represented by the structural formula:

$$\left[\begin{array}{c} -(C_nH_{2n}O)_xC_nH_{2n}-Y-CH_2\overset{R_1}{\overset{|}{C}}HCO \\ | \\ N \\ CH_2 \diagup \diagdown CH_2 \\ -CH_2CHCO-N \quad N-COCHCH_2- \\ | \quad \diagdown CH_2 \diagup \quad | \\ R_1 \qquad\qquad\qquad R_1 \end{array}\right]$$

wherein Y, $R_1$, $n$ and $x$ have the same meaning as above. These segments of the polymer structure would be linked to each other directly or through other segments which would have a formula depending upon the specific monomer system employed for the polymerization reaction.

By employing mixtures of bifunctional and trifunctional reactants three-dimensional polymers can be obtained. For example, these complex polymers can be produced by employing two bifunctional monomers as indicated above for the preparation of the linear polymers and adding to the monomer mixture a suitable amount of a polyfunctional reactant such as pentaerithritol, glycerol, triethanol amine and the like. The presence of the trifunctional component causes a crosslinking polymerization reaction to take place resulting in an infusible polymer.

The polymeric materials that are produced from the monomer mixtures containing trifunctional components so as to be capable of forming insoluble three-dimensional polymer products are the preferred products of the present invention. In spite of their insolubility in water these polymers maintain their hydrophilic properties. When immersed in water the polymers will tend to swell without, however, loss of cohesion or any deleterious change taking place in their chemical structure. Moreover, no substantial changes in the total physical or chemical properties result after repeated treatment with water wherein the polymers experience repeated swelling and deswelling cycles caused by wetting and drying. It is these desirable properties which make the new polymers of the present invention particularly valuable for treating textile materials.

It has now been discovered that desirable antistatic properties can be imparted to hydrophobic textile materials which normally tend to accumulate electrostatic charges by contacting said textile materials with a composition comprising a polyoxy-alkylene compound and a polyfunctional amide compound, as defined above, under alkaline conditions whereby a polymerization reaction takes place.

The durable antistatic finishes obtained according to the method of the present invention are particularly effective in preventing the accumulation of electrostatic charges on textile materials manufactured from hydrophobic fibers which have a relatively low capacity to retain moisture. Included in the group of hydrophobic fibers that can be treated according to the methods of this invention are synthetic fibers such as cellulose triacetate, polyamides, polyvinyl chloride, polyesters, polyacrylonitrile, polyolefins, and the like.

According to the present invention, the durable antistatic finishes are prepared by polymerizing, under alkaline conditions, a mixture of the monomers in which the ratio of reactants is appropriately selected and which can be considerably varied. In order to obtain the desired product in a reasonable amount of time, it is preferred to heat the mixture to accelerate the polymerization reaction. The polymerization reaction may be carried out in bulk polymerization, or on the desired substrate by an in situ process. For example, in carrying out the reaction in the presence of a textile a composition comprising a suitable mixture of the monomers is applied to the textile under alkaline conditions. The treating composition can be in the form of a solution, emulsion, dispersion and the like. Aqueous solutions are generally preferred for this purpose. Particular methods of application of the composition include impregnation by dipping, spraying, padding, and any other means by which textile materials are normally treated. The polymerization reaction takes place under alkaline conditions which can be affected by employing an alkaline catalyst or any suitable means by which an alkaline pH of the treating composition is achieved. The treated textile material can be heated to cause the monomers to undergo the polymerization reaction in the presence of the textile material. As a result of the polymerization reaction, the surfaces of the fibers in the treated textile material become coated with a transparent, continuous film of the hydrophilic polymer of the present invention. This antistatic finish is strongly adherent to the substrate and resists removal in laundering and dry cleaning operations and by virtue of its hygroscopicity provides a path for conducting electricity and thereby prevents accumulation of static charges on the textile material.

In general, the ratio of monomers employed in the polymerization reaction will determine the characteristics of the final polymer product as well as the specific reaction conditions which must be employed to produce the product. Where it is necessary to form a three-dimensional copolymer rapidly, a ratio of the total number of active hydrogen atoms, as determined by the Zerewitinov method, representing the sum of those that are present in the H—Y functional groups of Formula I plus those present in the trifunctional additive, if any, to the total number of reactive amide groupings of the structure $>NCO-Z$ and $>NCO-Z^1$ is in the range of about 0.8:1.2 to 1.2:0.8. It is seen that by employing this ratio a nearly stoichiometric ratio of functional groups in the monomer mixture is employed to obtain the preferred polymeric product.

When rapid formation of the copolymer product is not necessary or when it is desired to delay the gelation process which occurs by reaction of the monomer components, the trifunctional component in the monomer mixture can be omitted or monomer ratios can be employed in which one type of functional group is present in large excess over the other. By varying the proportions of the monomers, a prepolymer can be produced which is then mixed with an additional amount of a second polyfunctional monomer such as a trifunctional crosslinking monomer whereupon gelation is rapidly induced, if desired, in the presence of the textile material.

It is sometimes advantageous to employ polyfunctional monomers or water soluble polymers of polyoxyalkylene compounds in which ionic sites (e.g., amino groups) are present, as reactants in the polymerization reaction with the above defined amines.

For example, polyfunctional polyoxyalkylene compounds can be prepared by reacting alkanolamines with polyoxyalkylene dihalides as shown in the following equations:

(1)
$$A(C_nH_{2n}O)_mC_nH_{2n}A + 2HOCH_2CH_2NHCH_2CH_2OH$$

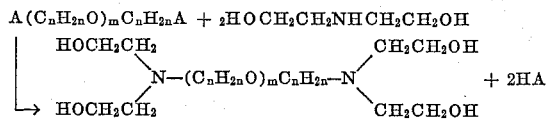

(2)
$$A(C_nH_{2n}O)_mC_nH_{2n}A + 2(HOCH_2CH_2)_3N$$

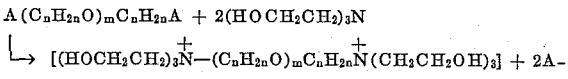

(3)
$$A(C_nH_{2n}O)_mC_nH_{2n}A + HO(CH_2CH_2O)_xCH_2CH_2NH_2$$

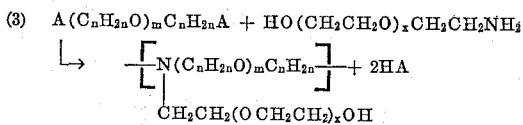

In Equations 1, 2 and 3, the symbol A represents chlorine, bromine or iodine, and $n$, $m$, $x$ have the meaning defined above. The above equations are illustrative of reactions suitable for the preparation of polyoxyalkylene compounds suitable for practicing the processes of the present invention. Other alkanolamines can also be employed for the preparation of polymeric compounds by reaction with the polyfunctional amides defined above.

It has already been pointed out that the reaction takes place under alkaline conditions. Where the monomer or polyfunctional additives contain amino groups, for example, the addition of a specific alkaline catalyst is sometimes not required. Where the monomers are neutral, or not sufficiently alkaline to initiate the polymerization, an alkaline material must be added to the reaction mixture. Various alkaline catalysts can be employed for this purpose depending on the desired rate of reaction and the degree to which the textile as well as the copolymer are susceptible to alkaline attack. Examples of suitable catalysts which can be used for the present invention are alkali metal hydroxides, alkoxides, carbonates, bicarbonates, phosphates, silicates and acetates, as well as quaternary ammonium hydroxides and tertiary amines. The choice of the particular alkaline catalyst employed will be influenced by the reaction system and on the nature of the desired product. In the event that strong bases such as alkali hydroxides are employed it is generally desirable to wash out the residual base promptly after the polymer is formed because prolonged contact with strong base can result in discoloration and degradation of the polymer. Moreover, washing is also necessary if the textile material is hypersensitive to alkali. When alkali catalysts such as alkali carbonates and bicarbonates are used, colorless polymers are formed which are stable to prolonged contact with catalyst at moderate temperature thereby obviating the necessity for washing to remove the catalyst.

To concentration of the alkali material can be varied widely, again depending on the particular catalyst employed, speed of reaction, temperature, etc. Amounts ranging from about 1% to about 25% based on the total weight of reactants can be employed although amounts of about 5% to about 15% are preferred. Stronger catalysts are generally employed in lesser quantities than weaker catalysts, all other conditions being held the same. At higher temperatures generally lower quantities of catalyst can be employed. As a general rule, higher concentrations of alkaline catalysts will increase the polymerization rate; however, higher concentrations of base not only increase the rate of polymerization of the reactants but may also increase the rate of by-product formation. Accordingly, the catalyst concentration is adjusted so as to avoid undesirable amounts of by-products. The temperature at which the polymerization reactions are carried out will depend on the catalyst and monomer systems employed and consequently can be varied considerably. It has been found that temperatures generally above 80° C. are preferred although lower temperatures can be employed. The disadvantage of employing lower temperature is that the reaction rate is slower and sometimes too slow to be of commercial practicability. The optimum temperature for the reaction will depend in part on the monomer structure. For example, when the reactive amide monomer contains unsaturation in the terminal groupings, lower temperatures for the polymerization can be employed because the unsaturated terminal grouping is highly reactive. Conversely, when the amide monomer contains saturated terminal groups the temperature must be somewhat higher in order to permit removal of the by-product water or alcohol which is formed in the course of the reaction. Generally, the temperatures should be high enough to permit the water or alcohol to evaporate.

When the methods of the present invention are carried out in situ, that is in the presence of the textile material or other hydrophobic material, it is generally convenient to dissolve the required monomers and catalysts in an aqueous solution or in an organic solvent and contact the hydrophobic material with the solution. This can be done by dipping or padding or any other suitable means. The treated hydrophobic material is then dried to evaporate the solvent and heated to bring about the copolymerization reaction and complete the formation and insolubilization of the copolymer on the hydrophobic material. Thereafter, if desired, the treated textile material can be washed to remove residual catalysts and unreacted or partially reacted monomers.

Because the monomer mixtures employed are generally water soluble, the invention described herein presents a convenient procedure for treating textile materials which avoids the more troublesome methods involving non-soluble or partially soluble materials which have been used in the past. Moreover, a further advantage lies in the stability of the aqueous solution of the monomers at room temperature, often even in the presence of a catalyst.

The effectiveness of the new finishes on hydrophobic textile materials in particular can be evaluated by known test procedures. The electrical resistivity of untreated hydrophobic material is generally extremely high; for example, in the case of fabrics manufactured from hydrophobic fibers it is known that a specific resistivity higher than $10^{13}$ ohms at 40% relative humidity indicates a strong tendency for the accumulation of electrostatic charges. Test methods for measuring resistivity in textiles are described in several publications to which reference is made, including the Technical Manual of the American Association of Textile Chemists and Colorists, vol. 35, pp. 138–139, Standard 76–1959 (Fabrics) and Tentative 84–1955 (Yarns). The resistivity results reported in the examples hereinafter were obtained by the test described in the above publication.

In taking measurements of resistivity of various hydrophobic materials the values obtained are compared to the resistivity of common cotton textile. It is known in the industry that cotton fabrics do not exhibit an objectionable tendency to accumulate static charges and therefore the specific area resistivity of common cotton textiles which is about $5 \times 10^{12}$ ohms at 40% relative humidity can be taken as a standard for purposes of comparison. Treated hydrophobic textile exhibiting resistivity lower than cotton are rated as fully satisfactory with regard to the tendency to accumulate static charges. The resistance of the antistatic finishes to removal after repeated laundering and dry cleaning can be evaluated simply by measuring the resistivity of the treated materials after repeated washings or dry cleaning cycles.

The following examples are illustrative of the present invention but are not considered to limit the present invention in any way. All parts are by weight unless otherwise specified.

EXAMPLE I

A mixture was prepared from 4.6 grams of 1,3,5-tris-beta-methoxypropionyl-s-perhydrotriazine (M.P. 39–40° C.) and 11.6 g. of a polyethylene glycol having average composition $HO(CH_2CH_2O)_{12}CH_2CH_2OH$, average molecular weight 590, and marketed by the Union Carbide Chemicals Co. under the name of Carbowax 600. The mixture which contained equivalent amounts of monomers was divided into 4 aliquots, and each aliquot was mixed with 2 ml. of an aqueous alkaline solution of the composition indicated in the table below under the column headed "Catalyst Solution." Each aliquot was heated at 150° C. and the time required to form a gel was recorded. The results are tabulated below.

| Sample | Catalyst Solution | Gel time (minutes) |
|---|---|---|
| A | 5% $K_2CO_3$ | 40 |
| B | 15% $K_2CO_3$ | 28 |
| C | 25% $K_2CO_3$ | 17 |
| D | 5% KOH | >120 |
| E | None | No gel |

It is apparent from these results that $K_2CO_3$ is a more effective catalyst than KOH for the polymerization reaction leading to formation of a three-dimensional polymer or gel.

EXAMPLE II

Varying ratios of the monomers used in Example I (1,3,5 - tris - beta - methoxypropionyl - s - perhydrotriazine) (referred to below in the table as TMPT) and polyethylene glycol-Carbowax 600, referred to below as PEG 600 were mixed and reacted at 150° C. in the presence of $K_2CO_3$, the amount of $K_2CO_3$ employed being in each case about 0.5 g. for 3 grams of monomer mixture (or 16% $K_2CO_3$ based on the total weight of monomers). The catalyst was added to the monomers in the form of a 25% aqueous solution in order to assure thorough dispersion of the catalyst in the monomers. The reaction time required for gelation at 150° C., employing varying ratios of reactants and keeping other conditions constant is shown in the table below. Ratios of reactants are expressed in moles and by weight. The stoichiometric ratio of functional groups for the trifunctional TMPT and the bifunctional PEG 600 corresponds to a mole ratio TMPT/PEG 600 of 0.66: The mole ratio nearest this stoichiometric value (sample E in the table) resulted in the shortest gel time.

| Sample | Mole Ratio, TMPT/PEG 600 | Weight Ratio, TMPT/PEG 600 | Gel time (min.) |
|---|---|---|---|
| A | 0 | 0 | No gel |
| B | 0.1 | 0.057 | 46 |
| C | 0.3 | 0.172 | 30 |
| D | 0.5 | 0.287 | 23 |
| E | 0.7 | 0.403 | 16 |
| F | 0.9 | 0.515 | 18 |
| G | 1.0 | 0.575 | 25 |
| H | 1.2 | 0.690 | 30 |
| I | 1.5 | 0.865 | 58 |
| J | 2.0 | 1.150 | 55 |

Mol ratios TMPT/PEG of 0.3 to 1.2 were optimum for rapid formation of three dimensional polymers.

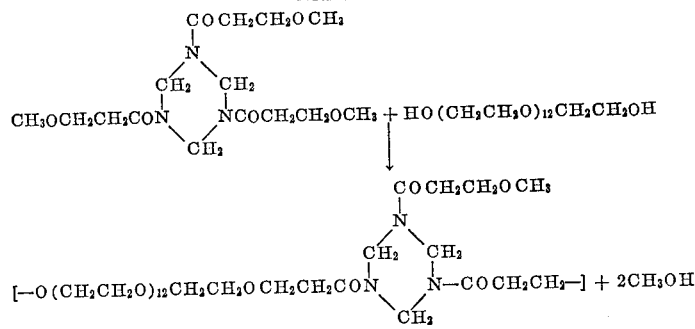

EXAMPLE III

Example II was repeated using lower concentrations of catalyst in order to determine the amount of methanol formed and removed in the course of the polymerization reaction. In this experiment, the monomers were mixed in the desired ratio and each mixture was carefully weighed. 1 gram of a 25% aqueous solution of $K_2CO_3$ was then added to each mixture, corresponding to a $K_2CO_3$ concentration of 0.25 gram for 10 grams of total monomers (or 2.5% $K_2CO_3$ based on the total weight of monomers). The reaction mixtures were then heated at 150° C.±3° C. until gelation took place. After cooling, the weight of each gel was carefully recorded. The weight loss observed during the polymerization reaction indicated the approximate percentage of the methoxypropionyl groups present which had participated in the polymerization reaction, eliminating methanol. The results obtained are tabulated below.

| Sample | Mol Ratio, TMPT/ PEG 600 | Wt. of Reaction Mixture (g.) | | Wt. Loss (g) | Percent $CH_3OH$ Reacted |
|---|---|---|---|---|---|
| | | Initial | After gelation | | |
| 1 | 0.5 | 8.16 | 7.82 | 0.34 | 50 |
| 2 | 0.7 | 9.00 | 8.45 | 0.55 | 55 |
| 3 | 0.9 | 9.90 | 9.25 | 0.65 | 48 |
| 4 | 1.0 | 10.30 | 9.59 | 0.71 | 42 |
| 5 | 1.2 | 11.20 | 10.09 | 1.11 | 51 |

From this data it is indicated that about 50% of the methoxypropionyl groups participate in the polymerization reaction before a three dimensional network is formed.

EXAMPLE IV

The gel samples prepared in Example III were tested for water resistance and moisture retention by performing the following experiment. Each weighed gel sample was suspended in 20 ml. of $3.62 \times 10^{-4}$ N hydrochloric acid and allowed to stand at room temperature for 1 hour in order to neutralize the residual alkaline catalyst. The samples were filtered, suspended in water and allowed to remain soaking in water at room temperature overnight. Each gel sample was filtered, washed with water, dried in a vacuum dessicator and weighed. In each case, the weight of gel after exposing to water in the manner described was found to be higher than the original weight.

Sample: Percent increase after exposure to water
1 _____ 15.6
2 _____ 30.8
3 _____ 24.6
4 _____ 12.8
5 _____ 69.2

These weight increments indicate the tendency to moisture retention (hygroscopicity) which confers to the insoluble polymer their valuable antistatic properties.

EXAMPLE V

The experiment of Example I (samples A, B, C) was repeated at various temperatures in order to establish the effect of temperature on rate of gelation.

| Sample | Catalyst Solution | Gel time (minutes) at— | | |
|---|---|---|---|---|
| | | 135° C. | 150° C. | 165° C. |
| A | 5% $K_2CO_3$ | >60 | 40 | 21 |
| B | 15% $K_2CO_3$ | >60 | 28 | 17 |
| C | 25% $K_2CO_3$ | >60 | 17 | 14 |

Increasing temperature in each case accelerated the gel formation, and the difference in rate of gelation was greater at the lower catalyst concentration.

EXAMPLE VI

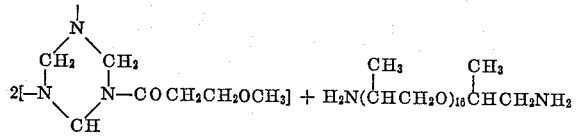

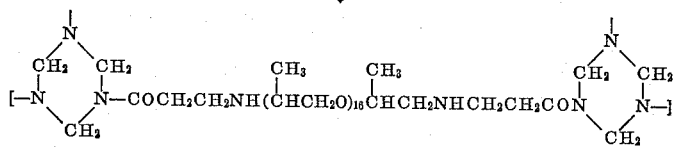

Equivalent amounts of 1,3,5-tris-beta-methoxypropionyl-s-perhydrotriazine (TMPT) and a polyether diamine having average composition

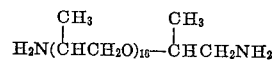

average molecular weight 1000 and marketed by the Union Carbide Chemicals Co. under the name of polyether diamine L-1000, were mixed. Four gram aliquots of the mixture were heated at 150° C.±3° C. after adding 2 ml. of catalyst solution, and the time required for gelation was recorded. The results are tabulated below.

| Sample | Catalyst Solution | Gel time (minutes) |
|---|---|---|
| A | None | >60 |
| B | 5% $Na_2CO_3$ | 11 |
| C | 15% $Na_2CO_3$ | 13 |
| D | 25% $Na_2CO_3$ | 13 |

EXAMPLE VII

An intimate mixture was prepared from 3 monomers in the following proportions:

4.6 g. (0.04 mol) TMPT
18.0 g. (0.03 mol) Carbowax 600
30.0 g. (0.03 mol) polyether diamine L-1000

Four gram aliquots of this mixture were treated with 2 ml. of catalyst solution, and the mixtures were heated at 150° C. until gelation was observed. The following gel times were recorded.

| Sample | Catalyst Solution | Gel time (minutes) |
|---|---|---|
| A | None | >60 |
| B | 5% $K_2CO_3$ | 17 |
| C | 15% $K_2CO_3$ | 18 |
| D | 25% $K_2CO_3$ | 18 |

It is apparent from the above examples that under comparable conditions polymerization proceeds more rapidly with a diamine monomer (Example VI) than with a glycol monomer (Example I). With mixtures of a glycol and a diamine (Example VII), the polymerization reaction takes place at an intermediate rate.

EXAMPLE VIII

Samples of white taffeta fabric woven from Dacron polyester yarn were impregnated on a laboratory padder with aqueous solutions containing 4.5% KHCO₃ and varying concentrations of 1,3,5-tris-beta-methoxypropionyl-s-pehydrotriazine (TMPT) and of Carbowax 600 (PEG 600). The wet pickup of the fabric was about 33%, and thus the percent concentration of the catalyst and each monomer on the fabric was approximately ⅓ of the percent concentration in solution. The treated fabric samples were dried, heated in a forced draft oven for 5 minutes at 160° C. to bring about formation of an insoluble hygroscopic polymer on the fiber surface and rinsed. The samples so treated had excellent appearance. They were not appreciably yellowed or stiffened, and they exhibited excellent durable antistatic properties, as shown by resistivity measurements (SAR) (abbreviation for specific area resistivity) initially and after repeated laundering. The results obtained in this experiment are tabulated below:

| Sample | Percent Monomers in treating Solution | | SAR Initial | (Ohms) at 40% RH | |
|---|---|---|---|---|---|
| | PEG 600 | TMPT | | 1L | 10L |
| A | 8 | 4.6 | 2×10⁹ | 3×10¹⁰ | 1×10¹¹ |
| B | 6 | 4.6 | 4×10⁹ | 6×10¹⁰ | 2×10¹¹ |
| C | 6 | 2.3 | 2×10⁹ | 1×10¹¹ | 4×10¹¹ |
| D | 0 | | >10¹³ | >10¹³ | >10¹³ |

Control—KHCO₃ only.

Each laundering (L) at 60° C. in a household washing washing machine with a commercial synthetic detergent.

EXAMPLE IX

The experiment of Example VIII was repeated, except that 13.5% Carbowax 1000 replaced 8% Carbowax 600, and 10% Carbowax 1000 replaced 6% Carbowax 600 in the treating solutions A, B and C. The results obtained were comparable to those shown in Example VIII.

EXAMPLE X

*N,N′-tetrakis(beta-hydroxyethyl)polyglycol diamine*

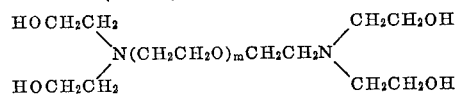

Into a 500 cc. three-necked flask were charged 0.2 m. (127.4 parts) dichloride of polyethylene glycol 600, 0.4 m. (42 parts) diethanol amine, 35.2 parts NaHCO₃ and 200 parts of water as the diluent. The mixture was heated to a reflux in 1 hour. Heating was continued till no increase of inorganic chloride ion was observed. After a period of 15 hours, the found percent Cl⁻ ion was 3.63% against the calculated value of 3.67%. The water in the mixture was stripped off under vacuo and the water-free residue was dissolved in isopropanol to separate the inorganic salt. After stripping off the isopropanol a light brown viscous liquid was recovered and which weighed 119.6 grs. giving a yield of 77.2%. The product N,N′-tetrakis(beta-hydroxyethyl)polyglycol diamine was soluble in water.

EXAMPLE XI

*Prepolymer from dichloride of polyethylene glycol 600 and a polyglycol amine*

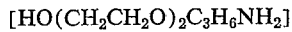

(A) Into a 500 cc. three-necked flask were charged 0.2 m. (127.4 parts) dichloride of polyethylene glycol 600, 0.2 m. (32.6 parts) polyglycol amine H163 (a product of Union Carbide Chemicals), 35.2 parts NaHCO₃ and 200 parts water as the diluent. The mixture was heated to a reflux in 1 hour. Heating was continued till no increase of inorganic chloride ion was observed. After a period of 15 hours, the found percent Cl⁻ ion was 3.32% versus a calculated value of 3.76%. The mixture was mixed with isopropanol and the inorganic salt precipitated was filtered off. The water-isopropanol diluent was stripped off under vacuo. The product recovered was a light brown viscous liquid which weighed 124.4 grs. corresponding to a yield of 91.6%. The prepolymer was soluble in water.

(B) Into a 500 cc. three-necked flask were charged 0.2 m. (127.4 parts) dichloride of polyethylene glycol 600, 0.2 m. (32.6 parts) polyglycol amine H163 (a product of Union Carbide Chemicals), 55.28 parts K₂CO₃ and 100 parts isopropanol as the diluent. The mixture was heated to a reflux in 1 hour. Heating was continued till no increase of inorganic chloride ion was observed. After a period of 30 hours, the found percent Cl⁻ ion was 3.63% against a calculated value of 4.52%. The inorganic salt precipitated was filtered off. The isopropanol was stripped off under vacuo. The product recovered was a brown viscous liquid which weighed 129.5 grs., giving a 94.5% yield. The prepolymer was soluble in water.

EXAMPLE XII

Four samples of plain weave white polyester fabric were impregnated on a laboratory padder with an aqueous solution containing 1.35% of 1,3,5-tris-betamethoxypropionyl - s - perhydrotriazine (TMPT)
8.65% of the product of Example XI(B)
2% potassium carbonate, anhydrous (K₂CO₃)

The wet pickup was 35%, and approximately 3.5% total monomers were deposited on the fabric. After padding, the samples were dried at 120° C., cured for five minutes at various temperatures to insolubilize the finish, washed in a nonionic detergent solution at 40° C. to remove residual soluble material and dried. The samples had excellent appearance, and outstanding antistatic properties even after 75 machine launderings. The curing temperature did not have an appreciable effect on the durability of the finish, as demonstrated by the data tabulated below.

| Sample | Curing Temp.° C. | SAR (Ohms) at 40% RH | | | |
|---|---|---|---|---|---|
| | | Initial | 10L | 35L | 75L |
| A | 140 | 1.4×10⁹ | 2.3×10¹⁰ | 7.5×10¹⁰ | 9×10¹² |
| B | 150 | 1.3×10⁹ | 2.4×10¹⁰ | 6.7×10¹⁰ | 9×10¹¹ |
| C | 160 | 2.4×10⁹ | 1.2×10¹⁰ | 6.7×10¹⁰ | 9×10¹¹ |
| D | 170 | 3.9×10⁹ | 4.0×10¹⁰ | 7.8×10¹⁰ | 6×10¹¹ |

The durability of this finish appears to surpass that of other known finish.

The durable antistatic finishes obtained according to the methods of the present invention are effective in that they have good properties after many laundering and dry cleanings. They are particularly effective in preventing the accumulation of static charges on hydrophobic materials, particularly textile hydrophobic materials, which are manufactured from the normally hydrophobic materials. These materials which exhibit the objectionable tendency to accumulate static charges include polyamide fibers normally referred to as nylon, polyester fibers, e.g. polyethylene terephthalate sold under the trademark Dacron, polyolefin fibers, acrylic and acrylonitrile fibers, polyvinyl chloride fibers, as well as cellulose triacetate fibers. Not only do the antistatic polymeric finishes of the present invention reduce the tendency to accumulate the static charges on textiles containing 100% hydrophobic materials but the finishes of the present invention are also well suited for and produce improved properties in textile materials containing blends and mixtures of hydrophobic fibers with natural fibers such as cellulose and wool.

What is claimed is:

1. A method for making polymers comprising polymerizing (1) a polyoxyalkylene compound containing at least two groups corresponding to the structure $$-(C_nH_{2n}O)-$$

where $n$ is an integer from 2 to 4 and at least two terminal groups selected from the group consisting of —OH, —SH and $$-\underset{H}{\overset{}{N}}R$$

wherein R is selected from the group consisting of hydrogen and lower alkyl, with (2) a polyfunctional amide compound containing at least two groups and no more than 3 per molecule of the formula $$\underset{X}{\overset{X}{\diagdown}}NCO-Z$$

said groups being linked together by hydrocarbon groups and where X is selected from the group consisting of aliphatic and cycloaliphatic hydrocarbon groups and hydrogen, provided that one of said Xs' is always a hydrocarbon group as defined, and where Z is selected from the group consisting of $$-\underset{R_1}{\overset{}{C}}=CH_2,\ -\underset{R_1}{\overset{}{C}}HCH_2OR_1\ \text{and}\ -\underset{R_1}{\overset{}{C}}HCH_2Q$$

wherein $R_1$ is selected from the group consisting of hydrogen and lower alkyl and Q is a polar residue derived from a reagent of weak nucleophilic character and is selected from the group consisting of the anion of a strong acid and the cation of a weak base, under alkaline conditions.

2. A method for making polymers comprising polymerizing (1) a polyoxyalkylene compound containing at least two groups corresponding to the structure $$-(C_nH_{2n}O)-$$

where $n$ is an integer from 2 to 4 and at least two terminal groups selected from the group consisting of —OH, —SH and —NRH wherein R is selected from the group consisting of hydrogen and lower alkyl, with (2) a polyfunctional compound of the formula $$\begin{array}{c}CO-Z^1\\|\\N\\CH_2\diagup\ \diagdown CH_2\\Z-CO-N\ \ \ \ \ N-CO-Z\\\diagdown CH_2\diagup\end{array}$$

wherein Z is selected from the group consisting of $$-\underset{R_1}{\overset{}{C}}=CH_2,\ -\underset{R_1}{\overset{}{C}}HCH_2OR_1\ \text{and}\ -\underset{R_1}{\overset{}{C}}HCH_2Q$$

wherein $R_1$ is selected from the group consisting of hydrogen and lower alkyl, Q is a polar residue derived from a reagent of weak nucleophilic character and is selected from the group consisting of the anion of a strong acid and the cation of a weak base, and $Z^1$ is selected from the group consisting of $$-\underset{R_1}{\overset{}{C}}HCH_2OR_1\ \text{and}\ -\underset{R_1}{\overset{}{C}}HCH_2Q$$

under alkaline conditions.

3. A method for making polymers comprising polymerizing (1) A polyoxyalkylene compound selected from the group consisting of $$H-Y-(C_nH_{2n}O)_mC_nH_{2n}-Y-H$$

$$\underset{|}{C}H_2O-(C_nH_{2n}O)_x-C_nH_{2n}-Y-H$$

$$\underset{|}{R}\overset{}{C}O-(C_nH_{2n}O)_x-C_nH_{2n}-Y-H$$

$$\underset{}{C}H_2O-(C_nH_{2n}O)_x-C_nH_{2n}-Y-H$$

and mixtures thereof wherein Y is selected from the group consisting of oxygen, sulfur and —NR, wherein R is selected from the group consisting of hydrogen and lower alkyl, $n$ is an integer from 2 to 4, $m$ is an integer from 3 to 50 and $x$ is an integer from 2 to 20, with (2) a polyfunctional amide compound containing at least two groups and no more than 3 per molecule of the formula $$\underset{X}{\overset{X}{\diagdown}}NCO-Z$$

said group being linked together by hydrocarbon groups and where X is selected from the group consisting of aliphatic and cycloaliphatic hydrocarbon groups and hydrogen, provided that one of said Xs' is always a hydrocarbon group as defined, and where Z is selected from the group consisting of $$-\underset{R_1}{\overset{}{C}}=CH_2,\ -\underset{R_1}{\overset{}{C}}HCH_2OR_1\ \text{and}\ -\underset{R_1}{\overset{}{C}}HCH_2Q$$

wherein $R_1$ is selected from the group consisting of hydrogen and lower alkyl and Q is a polar residue derived from a reagent of weak nucleophilic character and is selected from the group consisting of the anion of a strong acid and the cation of a weak base, under alkaline conditions.

4. A method for making polymers comprising polymerizing (1) a polyoxyalkylene compound selected from the group consisting of $$H-Y-(C_nH_{2n}O)_mC_nH_{2n}-Y-H$$

$$\underset{|}{C}H_2O-(C_nH_{2n}O)_x-C_nH_{2n}-Y-H$$

$$\underset{|}{R}\overset{}{C}O-(C_nH_{2n}O)_x-C_nH_{2n}-Y-H$$

$$\underset{}{C}H_2O-(C_nH_{2n}O)_x-C_nH_{2n}-Y-H$$

and mixtures thereof wherein Y is selected from the group consisting of oxygen, sulfur and —NR, wherein R is selected from the group consisting of hydrogen and lower alkyl, $n$ is an integer from 2 to 4, $m$ is an integer from 3 to 50 and $x$ is an integer from 2 to 20, with (2) a polyfunctional compound of the formula $$\begin{array}{c}CO-Z^1\\|\\N\\CH_2\diagup\ \diagdown CH_2\\ZCO-N\ \ \ \ \ N-COZ\\\diagdown CH_2\diagup\end{array}$$

wherein Z is selected from the group consisting of $$-\underset{R_1}{\overset{}{C}}=CH_2,-\underset{R_1}{\overset{}{C}}HCH_2OR_1\ \text{and}\ -\underset{R_1}{\overset{}{C}}HCH_2Q$$

wherein $R_1$ is selected from the group consisting of hydrogen and lower alkyl, Q is a polar residue derived from a reagent of weak nucleophilic character and is selected from the group consisting of the anion of a strong acid and the cation of a weak base, and $Z^1$ is selected from the group consisting of

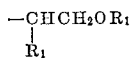

and

under alkaline conditions.

5. A method for making polymers comprising polymerizing
   (1) a polyoxyalkylene compound selected from the group consisting of

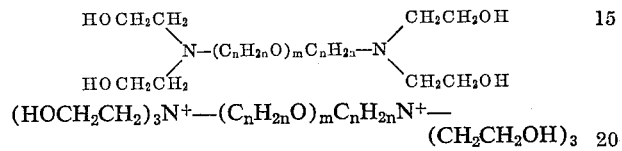

$(HOCH_2CH_2)_3N^+$—$(C_nH_{2n}O)_mC_nH_{2n}N^+$—
$\qquad\qquad\qquad\qquad\qquad\qquad (CH_2CH_2OH)_3$ and

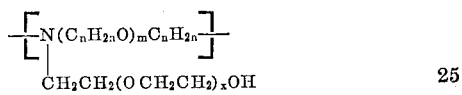

$n$ is an integer from 2 to 4, $m$ is an integer from 3 to 50 and $x$ is an integer from 2 to 20, with
   (2) a polyfunctional amide compound containing at least two groups and no more than three groups of the formula:

said groups being linked together by hydrocarbon groups and where X is selected from the group consisting of aliphatic and cycloaliphatic hydrocarbon groups and hydrogen, provided that one of said Xs' is always a hydrocarbon group as defined, and wherein Z is selected from the group consisting of

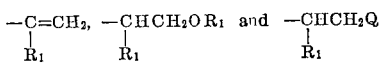

wherein $R_1$ is selected from the group consisting of hydrogen and lower alkyl and Q is a polar residue derived from a reagent of weak nucleophilic character and is selected from the group consisting of the anion of a strong acid and the cation of a weak base, under alkaline conditions.

6. A polymer containing a recurring group represented by the structural formula:

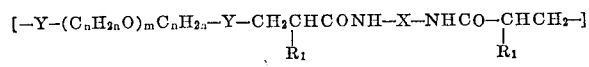

wherein Y is selected from the group consisting of oxygen, sulfur and —NR, where R and $R_1$ are selected from the group consisting of hydrogen and lower alkyl, $n$ is an integer from 2 to 4, $m$ is an integer from 3 to 50, X is an aliphatic hydrocarbon radical.

7. A polymer containing a recurring group represented by the structural formula:

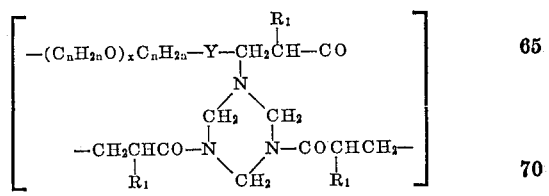

wherein Y is selected from the group consisting of oxygen, sulfur and —NR where R and $R_1$ are selected from the group consisting of hydrogen and lower alkyl, $n$ is an integer from 2 to 4, and $x$ is an integer from 2 to 20.

8. A copolymer of 1,3,5-tris-beta-methoxypropionyl-s-perhydrotriazine and polyethylene glycol.

9. A copolymer of 1,3,5-tris-beta-methoxypropionyl-s-perhydrotriazine and

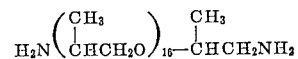

10. A method for imparting desirable properties including reduced tendency to accumulate electrostatic charges to textile materials which are normally hydrophobic comprising contacting said textile materials under alkaline conditions with a composition comprising
    (1) a polyoxyalkylene compound containing at least two groups corresponding to the structure $$—(C_nH_{2n}O)—$$

where $n$ is an integer from 2 to 4 and at least two terminal groups selected from the group consisting of —OH, —SH and

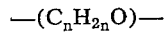

wherein R is selected from the group consisting of hydrogen and lower alkyl, and
    (2) a polyfunctional amide compound containing at least two groups and more than 3 per molecule of the formula

said groups being linked together by hydrocarbon groups and where X is selected from the group consisting of aliphatic and cycloaliphatic hydrocarbon groups and hydrogen, provided that one of said Xs' is always a hydrocarbon group as defined, and wherein Z is selected from the group consisting of

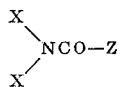

wherein $R_1$ is selected from the group consisting of hydrogen and lower alkyl and Q is a polar residue derived from a reagent of weak nucleophilic character and is selected from the group consisting of the anion of a strong acid and the cation of a weak base, and reacting the composition on said textile material.

11. A method as defined in claim 10 wherein the reaction is carried out in the presence of an alkaline catalyst.

12. A method for imparting desirable properties including reduced tendency to accumulate electrostatic charges to textile materials which are normally hydrophobic comprising contacting said textile materials, under alkaline conditions, with a composition comprising
    (1) a polyoxyalkylene compound containing at least two groups corresponding to the structure $$—(C_nH_{2n}O)—$$

where $n$ is an integer from 2 to 4 and at least two terminal groups selected from the group consisting of —OH, —SH and

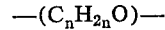

wherein R is selected from the group consisting of hydrogen and lower alkyl, with
    (2) a polyfunctional compound of the formula

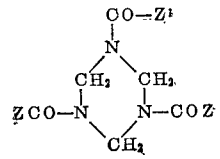

wherein Z is selected from the group consisting of

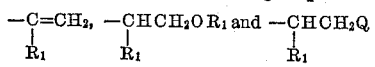

wherein $R_1$ is selected from the group consisting of hydrogen and lower alkyl, Q is a polar residue derived from a reagent of weak nucleophilic character and is selected from the group consisting of the anion of a strong acid and the cation of a weak base, and $Z^1$ is selected from the group consisting of

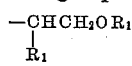

and

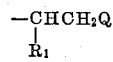

and reacting said composition on said materials.

13. A method as defined in claim 12 wherein the reaction is carried out in the presence of an alkaline catalyst.

14. A method for imparting antistatic properties to textile materials which normally have a tendency to accumulate static charges comprising contacting said textile materials, under alkaline conditions, with a prepolymer prepared by polymerizing
(1) a polyoxyalkylene compound containing at least two groups corresponding to the structure $$-(C_nH_{2n}O)-$$

where $n$ is an integer from 2 to 4 and at least two terminal groups selected from the group consisting of —OH, —SH and

wherein R is selected from the group consisting of hydrogen and lower alkyl, and
(2) a polyfunctional amide compound containing at least two groups and more than 3 per molecule of the formula

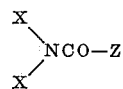

said groups being linked together by hydrocarbon groups and where X is selected from the group consisting of aliphatic and cycloaliphatic hydrocarbon groups and hydrogen, provided that one of said Xs' is always a hydrocarbon group as defined and wherein Z is selected from the group consisting of

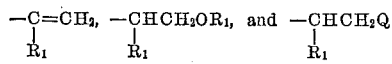

wherein $R_1$ is selected from the group consisting of hydrogen and lower alkyl and Q is a polar residue derived from a reagent of weak nucleophilic character and is selected from the group consisting of the anion of a strong acid and the cation of a weak base, and an additional amount of a polyfunctional compound containing at least two groups corresponding to the structure $-(C_nH_{2n}O)-$ wherein $n$ is an integer from 2 to 4 and at least two terminal groups selected from the group consisting of —OH, —SH and —NR wherein R is selected from the group consisting of hydrogen and lower alkyl, sufficient to crosslink the said prepolymer.

15. A method for imparting antistatic properties to textile materials which normally have a tendency to accumulate static charges comprising contacting said textile materials, under alkaline conditions, with a prepolymer prepared by polymerizing
(1) a polyoxyalkylene compound containing at least two groups corresponding to the structure $$-(C_nH_{2n}O)-$$

where $n$ is an integer from 2 to 4 and at least two terminal groups selected from the group consisting of —OH, —SH and

wherein R is selected from the group consisting of hydrogen and lower alkyl, with
(2) a polyfunctional compound of the formula

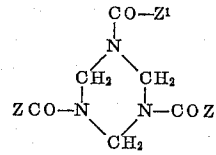

wherein Z is selected from the group consisting of

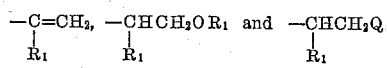

wherein $R_1$ is selected from the group consisting of hydrogen and lower alkyl, Q is a polar residue derived from a reagent of weak nucleophilic character and is selected from the group consisting of the anion of a strong acid and the cation of a weak base, and $Z^1$ is selected from the group consisting of

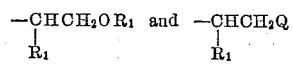

and an additional amount of a polyfunctional compound containing at least two groups corresponding to the structure $-(C_nH_{2n}O)-$ wherein $n$ is an integer from 2 to 4 and at least two terminal groups selected from the group consisting of —OH, —SH and —NR wherein R is selected from the group consisting of hydrogen and lower alkyl sufficient to crosslink the said prepolymer.

16. A method for imparting antistatic properties to textile materials which normally have a tendency to accumulate static charges comprising contacting said textile materials, under alkaline conditions, with a composition comprising a
(1) polyoxyalkylene compound containing at least two groups corresponding to the structure $-(C_nH_{2n}O)-$ where $n$ is an integer from 2 to 4 and at least two terminal groups selected from the group consisting of —OH, —SH and

wherein R is selected from the group consisting of hydrogen and lower alkyl, and
(2) a polyfunctional amide compound containing at least two groups and no more than 3 per molecule of the formula

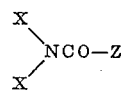

said groups being linked together by hydrocarbon groups and where X is selected from the group consisting of aliphatic and cycloaliphatic hydrocarbon groups and hydrogen, provided that one of said Xs' is always a hydrocarbon group as defined, and where Z is selected from the group consisting of

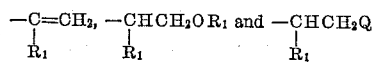

wherein $R_1$ is selected from the group consisting of hydrogen and lower alkyl and Q is a polar residue derived from a reagent of weak nucleophilic character and is selected from the group consisting of the anion of a strong acid and the cation of a weak base, and reacting said composition on said textile materials.

17. A method for imparting antistatic properties to textile materials which normally have a tendency to accumulate static charges comprising contacting said textile materials, under alkaline conditions, with a composition comprising a
(1) polyoxyalkylene compound selected from the group consisting of

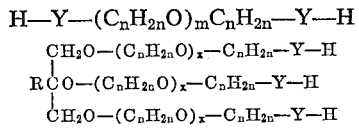

and mixtures thereof, wherein Y is selected from the group consisting of oxygen, sulfur and —NR wherein R is selected from the group consisting of hydrogen and lower alkyl, $n$ is an integer from 2 to 4, $m$ is an integer from 3 to 50, and $x$ is an integer from 2 to 20, and
(2) a polyfunctional amide compound containing at least two groups and no more than 3 per molecule of the formula

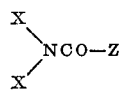

said groups being linked together by hydrocarbon groups and where X is selected from the group consisting of aliphatic and cycloaliphatic hydrocarbon groups and hydrogen, provided that one of said Xs' is always a hydrocarbon group as defined, and where Z is selected from the group consisting of

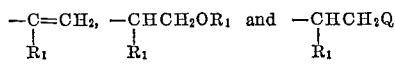

wherein $R_1$ is selected from the group consisting of hydrogen and lower alkyl and Q is the polar residue derived from a reagent of weak nucleophilic character and is selected from the group consisting of the anion of a strong acid and the cation of a weak base, and reacting said composition on said textile materials.

18. A method as defined in claim 17 wherein the polyfunctional amide is a member selected from the group consisting of $$Z—CONH(CH_2)_xNHCO—Z$$
and
$$Z—CON(CH_2)_xNCO—Z$$

wherein $x$ is an integer from 1 to 6, Z is selected from the group consisting of

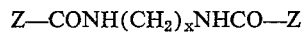
and

wherein $R_1$ is selected from the group consisting of hydrogen and lower alkyl, and Q is the polar residue derived from a reagent of weak nucleophilic character and is selected from the group consisting of the anion of a strong acid and cation of a weak base.

19. The method as defined in claim 17 wherein Q, the polar residue, is a member selected from the group consisting of

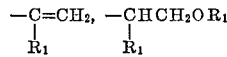
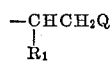

wherein M is a member selected from the group consisting of alkali metal and ammonium.

20. A method for imparting antistatic properties to textile materials which normally have a tendency to accumulate static charges comprising contacting said textile materials, under alkaline conditions, with a composition comprising a
(1) polyoxyalkylene compound containing at least two groups corresponding to the structure —$(C_nH_{2n}O)$— where $n$ is an integer from 2 to 4 and at least two terminal groups selected from the group consisting of —OH, —SH and

wherein R is selected from the group consisting of hydrogen and lower alkyl, and
(2) a polyfunctional compound of the formula

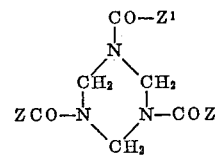

wherein Z is selected from the group consisting of

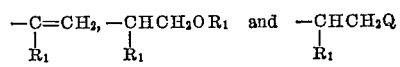

wherein $R_1$ is selected from the group consisting of hydrogen and lower alkyl, and Q is a polar residue derived from a reagent of weak nucleophilic character and is selected from the group consisting of the anion of a strong acid and the cation of a weak base, and $Z^1$ is selected from the group consisting of

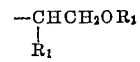
and
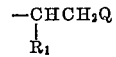

and reacting said composition on said materials.

21. A method for imparting antistatic properties to textile materials which normally have a tendency to accumulate static charges comprising contacting said textile materials, under alkaline conditions, with a composition comprising a
(1) polyoxyalkylene selected from the group consisting of

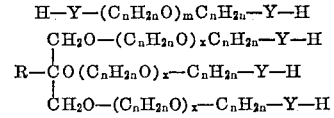

and mixtures thereof, wherein Y is selected from the group consisting of oxygen, sulfur and —NR wherein R is selected from the group consisting of hydrogen and lower alkyl, $n$ is an integer from 2 to 4, $m$ is an integer from 3 to 50 and $x$ is an integer from 2 to 20, and
(2) a polyfunctional compound of the formula

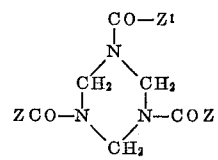

wherein Z is selected from the group consisting of

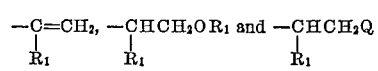

wherein $R_1$ is selected from the group consisting of hydrogen and lower alkyl, Q is a polar residue derived from a reagent of weak nucleophilic character and is selected from the group consisting of the anion of a strong acid and the cation of a weak base, and Z' is selected from the group consisting of

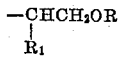

and

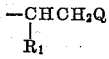

and reacting said composition on said materials.

22. The method as defined in claim 21 wherein Q, the polar residue, is a member selected from the group consisting of $-OSO_3M$, $-SSO_3M$, $-OCOCH_3$, $-OCOH$, $-OCOC_2H_5$, $-NC_5H_5$ and

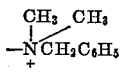

wherein M is a member selected from the group consisting of alkali metal and ammonium.

23. A method for imparting antistatic properties to textile materials which normally have a tendency to accumulate static charges comprising contacting said textile materials, under alkaline conditions, with a composition comprising a (1) polyoxyalkylene compound

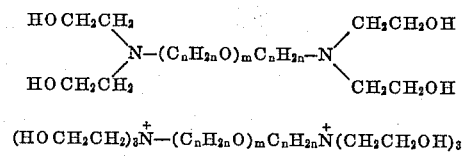

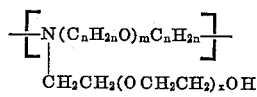

and

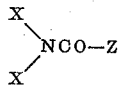

$n$ is an integer from 2 to 4, $m$ is an integer from 3 to 50 and $x$ is an integer from 2 to 20, and (2) a polyfunctional amide compound containing at least two groups and no more than three groups of the formula:

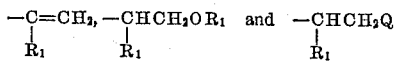

said groups being linked together by hydrocarbon groups and where X is selected from the group consisting of aliphatic and cycloaliphatic hydrocarbon groups and hydrogen, provided that one of said Xs' is always a hydrocarbon group as defined wherein Z is selected from the group consisting of $-C=CH_2$, $-CHCH_2OR_1$ and $-CHCH_2Q$
 $|$         $|$              $|$
 $R_1$      $R_1$            $R_1$ wherein $R_1$ is selected from the group consisting of hydrogen and lower alkyl and Q is a polar residue derived from a reagent of weak nucleophilic character and is selected from the group consisting of the anion of a strong acid and the cation of a weak base, and reacting said composition on said textile materials.

24. A method for imparting antistatic properties to textile materials which normally have a tendency to accumulate static charges comprising contacting said textile materials with a composition comprising 1,3,5-tris-beta-methoxypropionyl-s-perhydrotriazine and a polyoxyalkylene compound containing at least two groups corresponding to the structure $-(C_nH_{2n}O)-$ wherein $n$ is an integer from 2 to 4 and at least two terminal groups selected from the group consisting of $-OH$, $-SH$ and

wherein R is selected from the group consisting of hydrogen and lower alkyl in the presence of an alkaline catalyst.

25. A method for imparting antistatic properties to textile materials which normally have a tendency to accumulate static charges comprising contacting said textile materials with a composition comprising 1,3,5-tris-beta-methoxypropionyl-s-perhydrotriazine and a polyether diamine of the structure

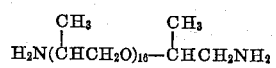

in the presence of an alkaline catalyst.

26. A textile material having improved properties including reduced tendency to accumulate electrostatic charges, said textile material having attached to its exposed surfaces a polymer comprising the reaction product of (1) a polyoxyalkylene compound containing at least two groups corresponding to the structure

where $n$ is an integer from 2 to 4 and at least two terminal groups selected from the group consisting of $-OH$, $-SH$ and $-NR$ wherein R is selected from the group consisting of hydrogen and lower alkyl, and (2) a polyfunctional amide compound containing at least two groups and no more than 3 per molecule of the formula

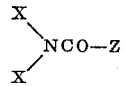

said groups being linked together by hydrocarbon groups and where X is selected from the group consaid groups being linked together by hydrocarbon groups and hydrogen, provided that one of said Xs' is always a hydrocarbon group as defined, and wherein Z is selected from the group consisting of

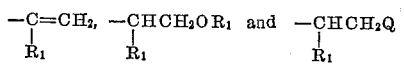

wherein $R_1$ is selected from the group consisting of hydrogen and lower alkyl and Q is a polar residue derived from a reagent of weak nucleophilic character and is selected from the group consisting of the anion of a strong acid and the cation of a weak base.

27. A textile material having improved properties including reduced tendency to accumulate electrostatic charges, said textile material having attached to its exposed surfaces a polymer comprising the reaction product of (1) a polyoxyalkylene compound containing at least two groups corresponding to the structure

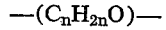

where $n$ is an integer from 2 to 4 and at least two terminal groups selected from the group consisting of $-OH$, $-SH$ and $-NR$ wherein R is selected from the group consisting of hydrogen and lower alkyl, with (2) a polyfunctional compound of the formula

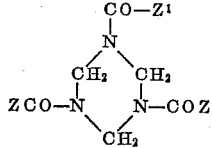

wherein Z is selected from the group consisting of

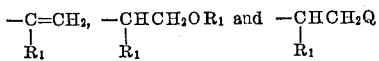

wherein $R_1$ is selected from the group consisting of hydrogen and lower alkyl, Q is a polar residue derived from a reagent of weak nucleophilic character and is selected from the group consisting of the anion of a strong acid and the cation of a weak base, and $Z^1$ is selected from the group consisting of

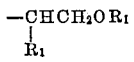

and

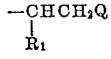

References Cited

UNITED STATES PATENTS

| | | | |
|---|---|---|---|
| 3,016,281 | 1/1962 | Kropa et al. | 8—116.2 |
| 3,063,870 | 11/1962 | Wakeman et al. | 117—139.5-0 |
| 3,070,552 | 12/1962 | Tesoro et al. | 117—139.5-0 |
| 3,108,011 | 10/1963 | Frotscher | 117—139.5-0 |

OTHER REFERENCES

Hayek: "Antistatic Finishes for Textiles," American Dyestuff Reporter, June 7, 1954, pp. 368–371 relied on. (Copy in 260, Antistatic Digest, Group 140.)

JOSEPH L. SCHOFER, *Primary Examiner.*

H. I. CANTOR, *Assistant Examiner.*

UNITED STATES PATENT OFFICE
CERTIFICATE OF CORRECTION

Patent No. 3,351,622                                              November 7, 1967

Giuliana C. Tesoro

It is hereby certified that error appears in the above numbered patent requiring correction and that the said Letters Patent should read as corrected below.

Column 6, line 43, for "To" read -- The --; column 9, li1 62, for "dessicator" read -- desiccator --; column 13, line 2( column 14, line 28, column 15, line 39, column 16, line 36, column 17, line 48, column 18, line 65, column 19, line 33, column 21, line 55, and column 22, line 43, for "Xs'", each occurrence, read -- X's --; column 15, lines 64 to 70, the formula should appear as shown below instead of as in the patent:

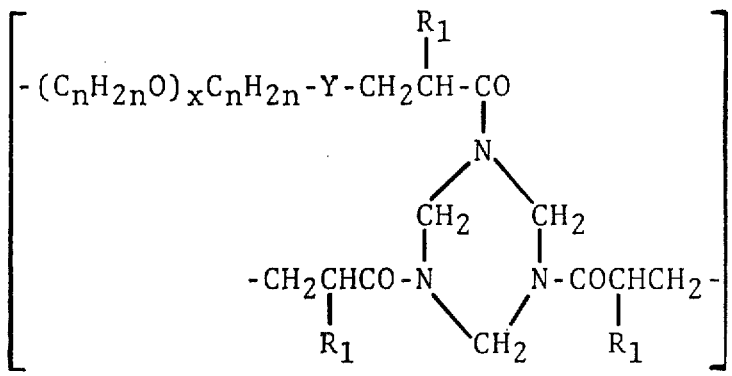

column 16, line 26, and column 17, line 39, for "and more", each occurrence, read -- and no more --; column 22, line 26, for "$-(C_nH_{2n})-$" read -- $-(C_nH_{2n}O)-$ --; line 42, for "said groups being linked together by hydrocarbon" read -- sisting of aliphatic and cycloaliphatic --.

Signed and sealed this 11th day of February 1969.

(SEAL)
Attest:

EDWARD M. FLETCHER, JR.                             EDWARD J. BRENNER
Attesting Officer                                       Commissioner of Patents